United States Patent [19]

Amberg et al.

[11] 4,008,347
[45] Feb. 15, 1977

[54] RECEPTACLE OF FOAMED PLASTIC LINED WITH UNORIENTED POLYOLEFIN FILM

[75] Inventors: Stephen W. Amberg, Toledo, Ohio; Frank S. Landers, Chicago, Ill.

[73] Assignee: Owens-Illinois, Inc., Toledo, Ohio

[22] Filed: June 24, 1974

[21] Appl. No.: 482,321

[52] U.S. Cl. .................................. 428/35; 458/315; 458/322; 156/311; 264/92; 264/321; 220/9 F; 229/14 C

[51] Int. Cl.² .................. B29D 27/00; B32B 27/08; B65D 25/18; B65D 5/56

[58] Field of Search ............ 428/35, 322, 321, 315; 220/9 F; 229/14 C, 2.5; 206/217, 233, 503, 509; 264/92, 321; 156/311

[56] References Cited

UNITED STATES PATENTS

| | | | |
|---|---|---|---|
| 3,420,729 | 1/1969 | Roberts | 428/35 |
| 3,532,247 | 10/1970 | Bridges | 220/9 F |
| 3,746,604 | 7/1973 | Reynolds | 428/322 X |
| 3,755,063 | 8/1973 | Massey et al. | 428/322 X |
| 3,772,138 | 11/1973 | Witman | 428/322 X |
| 3,816,234 | 6/1974 | Winfield | 428/315 X |
| 3,844,876 | 10/1974 | Wilson et al. | 428/315 X |

*Primary Examiner*—Philip Dier
*Attorney, Agent, or Firm*—Brooks Haidt Haffner & Delahunty

[57] ABSTRACT

A low-cost, throw-away receptacle such as a cup, picnic plate, or container, and closures for such receptacles, are made from foamed plastic material, preferably foamed polystyrene, which is lined on one or both sides with unoriented polyolefin film, preferably polypropylene. The film is secured to the foamed plastic base material using as a heat-sensitive adhesive a vinylic polymer or polyamide resin. Preferred vinylic polymers are based on vinyl acetate, and include polyvinyl acetate maleate copolymer. The film is coated with the initially wet adhesive which is dispersed in an emulsion or solvent carrier, and dried before laminating the film to the foam material. Laminating is done by heating the foam material to a temperature of from 250°–275° F., preheating the coated film to from 100°–180° F., and pressing the coated film surface against the heated foam using a cold platen or roller for from 10 to 15 seconds. The adhesive may be pigmented, and imprinted or applied over decorative printing on the transparent polyolefin film liner material, to provide colorful designs or printing appearing through the film and thus shielded by the liner material from scuffing or marring. The hard, glossy polyolefin film liner which provides the surface of such receptacles is strong to resist puncture, yet the foamed plastic base material provides both heat resistance and lightness, and does not absorb water or grease. Continuous processes and apparatus for making such laminated material and receptacles are disclosed.

9 Claims, 7 Drawing Figures

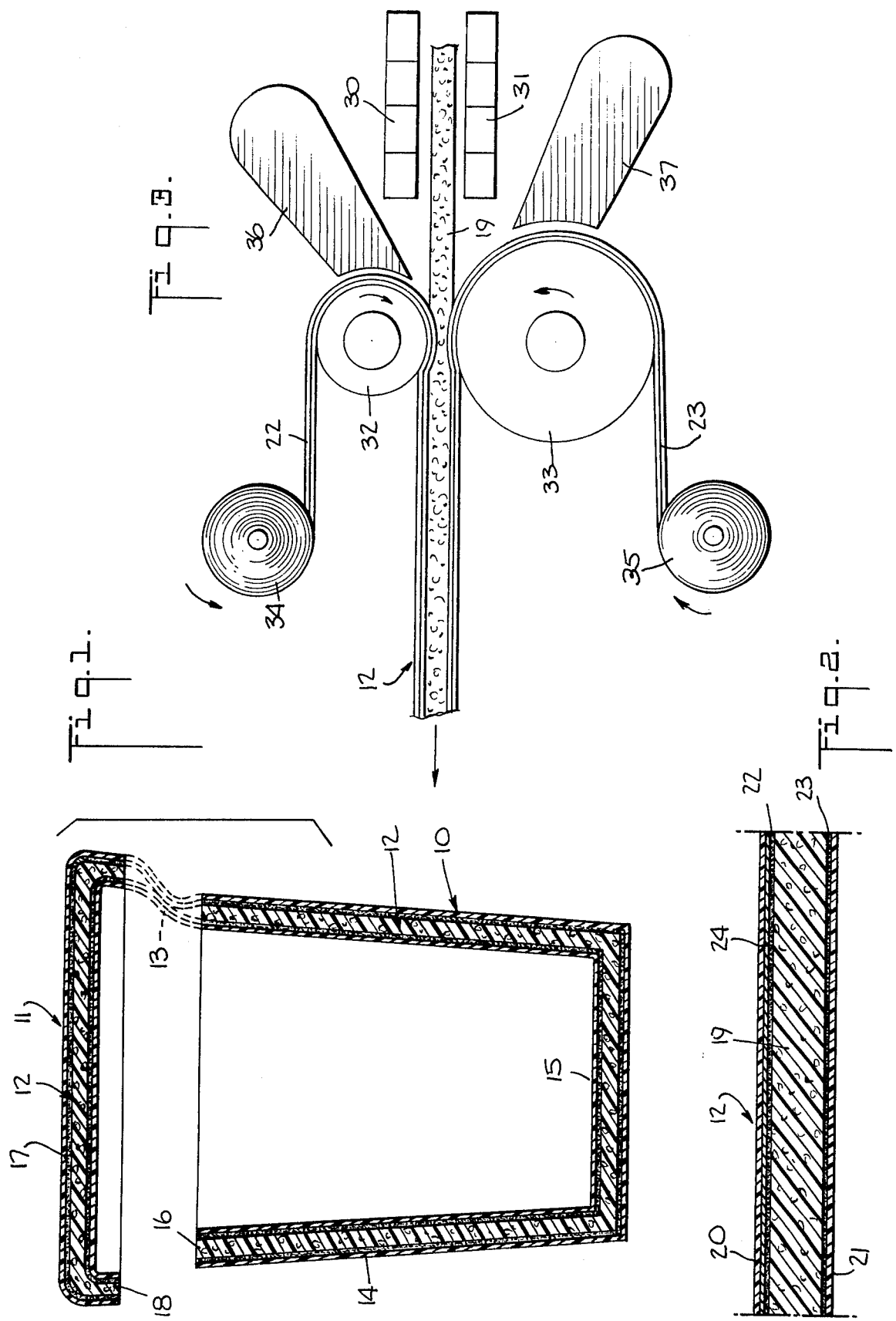

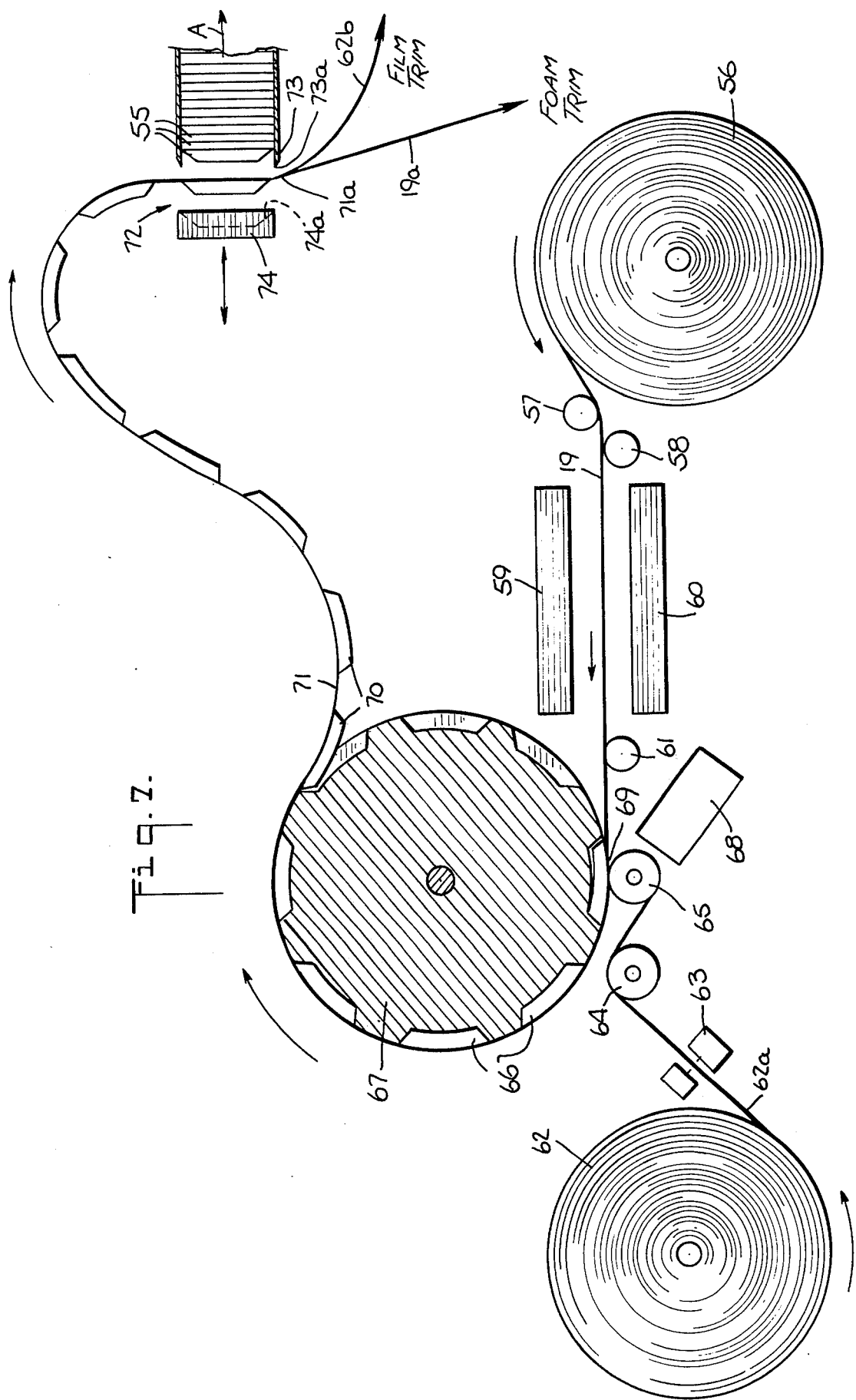

RECEPTACLE OF FOAMED PLASTIC LINED WITH UNORIENTED POLYOLEFIN FILM

This invention relates to low-cost, or throw-away receptacles such as plates, bowls, cups, and containers, and closures for such containers, and more particularly to such receptacles and closures as are formed of plastic material and techniques for making them.

There has been increasing public demand for very inexpensive and therefore disposable, yet sturdy and attractive receptacles such as plates, bowls, cups and containers and closures which are suitable for serving, transporting, storing, and heating foods or other products. Such disposable receptacles must have a variety of characteristics depending upon a variety of possible end uses of the receptacle. For example, if foods, beverages or other substances are to be placed on or in the plates, bowls, or containers, the material from which the receptacle is made must be impervious to such foods, beverages or other substances. If the contained product is to be exposed to heat, cold, extraordinary moisture or other special conditions during use, the receptacle must be capable of withstanding or resisting such environmental conditions. Further, to be marketable to housewives for use at picnics or on other similar occasions, the receptacle product must have attractive appearance. Thus, it must be possible to incorporate colors and designs in the receptacle, and its surface must be tough and somewhat hard to resist marring, as would occur when ordinary serving or eating utensils are used with the receptacles, as at a picnic or the like. Of course, since they are intended to be discarded after only limited use, such receptacles must be made from relatively inexpensive materials, and by straight-forward, mass-production methods, to be low in cost.

There has been some success in producing pulp-paper plates having tough or hard-finish plastic liners, as described for example in U.S. Pats. No. 3,697,369 (Amberg et al.) and U.S. Pat. No. 3,616,197 (Amberg et al.). However, such receptacles have some undesirable characteristics associated with the pulp paper base material of which they are made, as for example an affinity of the pulp for moisture which will deteriorate the receptacle. In the techniques described in these patents, a film of polyolefin material is drawn by vacuum or pressed by fluid pressure into conforming relation with, and adhesively secured by heat sensitive plastic material to a molded pulp paper plate. In U.S. Pat. No. 3,616,197 the adhesives disclosed include pigmented polyamide resins. Either the film or the base receptacle is heated to a temperature below the softening point of the film liner material, but above the softening point of the heat sensitive adhesive.

Another film-laminated paper plate and method for making the same is shown in U.S. Pat. No. 3,318,748 (Hurst). In the technique there described, a heat sealable plastic film is directly adhered to a flat backing material such as paper or cardboard, and the laminated material is then blanked and formed by heat and pressure into the shape of a receptacle.

Canadian patent No. 555,219 (Moncrieff) relates to the vacuum drawing and bonding of thermoplastic sheet material to a variety of base materials, including plastic, to make various articles, including dish-shaped or cup-shaped articles, the base or the sheet liner material being coated, if necessary, with a suitable heat sensitive adhesive, and the film being heated to a temperature above its softening point. For bonding cellulose acetate and like substitution derivatives of cellulose to surfaces of cellulose, the patent states that adhesives having a basis of polyvinyl acetate have been found particularly successful.

In addition, such disposable receptacles have previously been made from cellular foamed polystyrene plastic material to which polystyrene film is heat-laminated to provide a relatively hard film surface thereon. However, the laminated polystyrene film tends to be too easily separated from the underlying polystyrene foam material.

These previously known laminated receptacles are not completely satisfactory for use as inexpensive throwaway items usable for a range of different purposes, and capable of manufacture using techniques which are not complex. More particularly, the most desirable combination of receptacle base material and plastic liner material has not heretofore been available because it has not been known how such desirable materials can be easily and effectively secured or laminated together.

The use of foamed polystyrene plastic as a base material for such receptacles has several advantages as compared with the use of other materials, such as cardboard, pulp paper, unfoamed plastic and the like. It is low in cost, easily fabricated of uniform quality, and does not absorb moisture or greases. It is light in weight, and has a relatively smooth "skin" when formed by conventional methods, such that a thin film when laminated thereon will have an unusually smooth appearance. It is also known that polyolefin film has a number of advantages over other plastic materials used as a surface laminate for such articles. For example, polyolefin plastic materials provide a superior glossy, china-like appearance as is desirable in such receptacles, yet are very tough and resistant to scuffing and ordinary knife-cutting forces when such laminated receptacles are used as picnic plates. Moreover, polyolefin films are easily reverse-printed prior to lamination so as not to expose the printing to chemical attack or abrasion at the surface of the article, as may occur during shipping, handling and use. They also offer better resistance to attack from a wide variety of common chemicals to which such receptacles may be exposed, and have very low gas and moisture vapor transmission rates as compared with other commonly used film liner materials. Such films also have relatively high softening point temperatures, and therefore receptacles having film liners of such materials can be used at comparatively high temperatures.

However, it has been thought that polyolefin films are not easily or effectively adhered to polystyrene foam material, whether or not an adhesive is used, and it is intended by the present invention to provide both an adhesive for effectively and securely adhering a film liner of polyolefin material to a base material of foamed polystyrene plastic material, and an effective heat molding method of producing receptacles and closures of such laminated material, such that neither the laminating nor heat-molding processes will adversely affect the foam or cause wrinkling, or loss of hardness, gloss, or other characteristics of the film liner material.

Briefly describing the invention, receptacles are formed having a foamed polystyrene plastic base and a continuous surface coating of polyolefin film secured to the base by a vinylic polymer or polyamide resin adhesive. Such film liner is applied either to only one side, or to both sides of the base material, and may be printed with decorative designs prior to laminating such that the designs lie beneath the plastic film coating in the finished receptacle. The film coating provides a tough, smooth, glossy surface with a china-like appearance, and receptacles according to the invention are impervious to water and grease, and are sufficiently heat resistant so that they can be used for serving, transporting, storing and heating foods and other products. The foam base material is light in weight and affords good thermal insulation to the receptacle contents.

By using foamed plastic as the base material it is possible to produce receptacles at a considerably lower cost than disposable plastic lined pulp receptacles as are probably the most satisfactory receptacles of the type now available. And, since foamed plastic does not have the absorbency of paper or pulp, the possibility of delamination of the film liner due to exposure to high humidity is greatly reduced.

Since this invention contemplates the manufacture of receptacles, the foamed plastic base layer must have certain rigidity and strength characteristics to hold the receptacle contents. Such properties of rigidity and strength are provided by a cellular polystyrene foam layer having a foam density of 4 to 25 pounds per cubic foot and a thickness of about 20–80 mils. Good results have been obtained with 40 mil thickness, 13–14 pounds/cu.ft.polystyrene foam and with 70 mil thickness, 7–7.5 pounds/cu.ft. density polystyrene foam. It is believed that other foamed plastic materials might be used as the base layer material, but polystyrene foam is presently considered most suitable. The polystyrene should preferably be of a grade suitable for food use, and is manufactured in conventional manner using a blowing agent, nucleating agents, and the like normally used in making such materials. The resulting material has skin density somewhat greater than the density at the center of the foam. That is, the density of the foam is non-uniform across its thickness, it being higher at and near the immediate surface and lower in the interior where the blowing agent is less inhibited. It will accordingly be understood that the densities referred to herein in connection with the foam are the densities of the material gross.

The film, which is applied either to only one, or to both surfaces of the foam material base, is a substantially unoriented polyolefin film. It has been found that oriented polyolefin films, including biaxially oriented film, have greater tendency to wrinkle and are more difficult to secure firmly to a foam base than unoriented polyolefin films. Extensible, cast, unoriented polyolefin films are greatly superior to polystyrene films as coatings for polystyrene foam, since the film coating provided by such polyolefin films can be evenly distributed over the foam base and are relatively stress-free even in intricately shaped articles such as compartmented receptacles and the like. Both polyethylene and polypropylene films are suitable, but polypropylene films are particularly preferred.

The film thickness must be sufficient to provide a substantially unbroken film, but excessive thickness increases the difficulty of obtaining a good bond, and unnecessarily increases the cost of the polyolefin material used in the receptacle. Accordingly, it is preferred that the polyolefin material be from substantially one-half to five mils in thickness.

Polypropylene film affords a hard, glossy, china-like and smooth surface and is resistant to penetration or distortion by greases and liquids. Also, the relatively high softening point temperature of polypropylene contributes not only to the heat resistance of the receptacles formed, but also makes it possible to bond the film to the foamed plastic material at comparatively high temperatures but which are below the softening point of the film.

When the receptacle is to be covered by a closure, by the present invention they may be made simultaneously, and in joined hinge relation to each other by proper blanking out and scoring of the laminated sheet material, permitting the material to span and extend continuously between both the receptacle and closure blanks. When finally formed from such joined blanks, the laminated material spanning between the receptacle and closure will form a strong hinge for applying and removing the closure to and from the receptacle.

As noted above, it has been generally thought that foamed plastic material is incompatible with polyolefin film material for purposes of lamination. However, heat sensitive adhesives have been found which make it possible to laminate a polyolefin film to a foamed plastic base to provide a coating layer or liner of the type described.

Regarding the attributes of the adhesive, it must adhere readily and securely to both the foamed base material and the polyolefin film liner material both when the laminated material is made, and during the subsequent forming operation. It must also be one which can be rendered tacky or semi-fluid at a temperature sufficiently low that neither the polyolefin film nor the cells of the foam will be damaged during the laminating operation, yet sufficiently high to permit the receptacle forming operation to be conducted at a temperature high enough to avoid delamination or harmful splitting or breaking of the foamed material as would occur at lower temperatures. The softening point temperature of the adhesive must also be high enough to avoid delamination, or peeling of the liner from the base at the contemplated temperatures of hot food or soup placed in the receptacles formed of the laminate. Moreover, the preferred film material, unoriented polypropylene, has a softening point temperature range of about 275° to about 320° F., depending upon the process used to make the polypropylene sheet and, therefore, in accordance with the invention a suitable adhesive must be one that becomes tacky or semi-fluid at a temperature no higher than about 275° F.

It has been found that either vinylic polymer adhesives or polyamide resin adhesives which become tacky or semi-fluid at the temperature range of about 250° to 275° F. produce a good bond between unoriented polyolefin films and foamed plastic material, in particular polystyrene foam.

Preferred vinylic adhesives for use herein are based upon vinyl acetate. Preferred compositions include those which are copolymers of ethylene and vinyl acetate or a combination of vinyl acetate with ethylene-vinyl acetate copolymer, and polyvinyl acetate maleate copolymer. A blend of polyvinyl acetate and polyvinyl acetate acrylic copolymer has also been successfully employed. Such adhesives provide the necessary tackiness to provide finished articles having good resistance to delamination under conditions of high humidity, high temperature, exposure to greasy foods, and the like.

It is generally desirable to apply the adhesive to the film in the form of dispersions in water or other suitable vehicles. The term dispersions will be taken to include solutions, as well as other forms of dispersing the vinyl acetate in a vehicle. The vehicle used should be one which is non-toxic, suitable for food use, and non-flammable. Accordingly, in certain preferred embodiments of the present invention, aqueous dispersions, emulsions, and solvent solutions of vinylic materials are utilized.

Another resin adhesive found to effectively secure a polyolefin film liner to a foamed polystyrene base material is a solvent solution of polyamide resin, preferably pigmented using a conventional printers ink. This adhesive may be printed on to the film by a conventional printing method and dried prior to laminating to the foamed base material.

Both the unoriented polyolefin film and the foamed plastic base material can be obtained in the form of flat sheets, or rolled, continuous sheets, and by the present invention continuous processes for forming receptacles from both sheet and rolled stock have been developed. In accordance with one process the laminate is produced as a flat sheet, and receptacles are subsequently formed by vacuum or fluid pressure from the laminated sheet. Another process forms receptacles directly and continuously in conjunction with the application of the film coating to the base material from rolled stock.

In either case, the method of laminating the film liner to the base material should be essentially a dry lamination technique to ensure that all moisture (where emulsion or water based adhesive is used), or solvent (where the adhesive is a solvent type), is eliminated so that vapors are not formed as might produce bubbles between the film and the foam, or might attack the foam plastic base material during either the lamination or receptacle forming operations. That is, in one procedure the laminated strip material is first made either in sheets or continuous webs from separate webs of adhesive-coated film and the formed plastic base material, the adhesive having been printed or otherwise coated on to the film and dried prior to the lamination step.

In the continuous laminating procedure a web of polystyrene foam material is continuously fed and heated by infrared heaters to a temperature of about 260° F., and a continuously fed web of adhesive-coated film is heated using a hot air blower to a temperature within the range of from about 100° to about 180° F. The two materials are then laminated by passing them between a pair of laminating rollers which press the webs together. Using an air blower to preheat the film produces an ironing or smoothing effect, preventing the formation of wrinkles in the film which would thereafter crease as the film is fed through the nip between the laminating rollers. The temperature of the laminating pressure roll is maintained relatively cold, i.e. at a temperature of from about 100° to about 150° F., and the pressure should be maintained for a period of about 10 to 15 seconds to obtain a good bond.

It is important to control the temperature of both the foam plastic base material and the film liner material during the laminating process. If the foam material becomes too hot before it enters between the laminating rollers it will collapse under roller pressure and will not recover its original thickness, as is desired. Too much heat applied to the film will induce wrinkling and resulting creasing as the film passes through the nip between the laminating rollers. Of course, excessively high film temperatures would cause the film to melt and adhere to the rubber pressure roll.

It is also contemplated that respective polyolefin film layers may be simultaneously laminated to both sides of the foamed plastic sheet. In such case, the foamed material is initially heated on both sides, and separate film webs are preheated and applied as previously described to the respective sides of the foamed sheet.

Receptacles such as bowls, plates, and containers are formed by heating the so laminated sheet material to a temperature of about 250° F., then clamping the sheet across the rim of a mold. The mold is cold, i.e., at ambient room temperature, and the heated sheet is drawn into the mold by vacuum applied through the mold surface. The receptacle may be formed in this manner from base material which is film-lined on one or both sides.

Although receptacles may be thus formed intermittently in a stationary mold, the present invention contemplates a relatively high speed, continuous production technique wherein a plurality of molds are mounted along the periphery of a vacuum forming wheel so that the receptacles are formed continuously and sequentially along a continuous web of the laminate material. As the continuous web of thus formed receptacles are peeled from the wheel it is fed through a blanker which blanks out the individual receptacles. The continuous production arrangement further contemplates that the laminated web material itself will be formed as it is fed into the vacuum molder, thus eliminating subsequent heating of the material as would otherwise be required if the forming of the receptacles were to be conducted in a separate operation. Smooth finished edges are formed on the receptacles by the clamping pressure and heat of the heated blanker which collapses the foamed material adjacent the rim as the receptacles are cut from the web.

These and other objects, features and advantages of the invention will become more fully apparent from the following detailed description of the invention in several of its embodiments, when taken in conjunction with the accompanying drawings in which:

FIG. 1 is a somewhat schematic illustration, in section, of a film laminated foam receptacle and lid according to the invention, with the thickness of layers exaggerated to show the several layers more clearly;

FIG. 2 is a still further enlarged cross-sectional view of the material which forms the receptacle of FIG. 1;

FIG. 3 is a schematic illustration of apparatus for continuously forming a film laminated foam sheet according to the invention;

Figure 4:
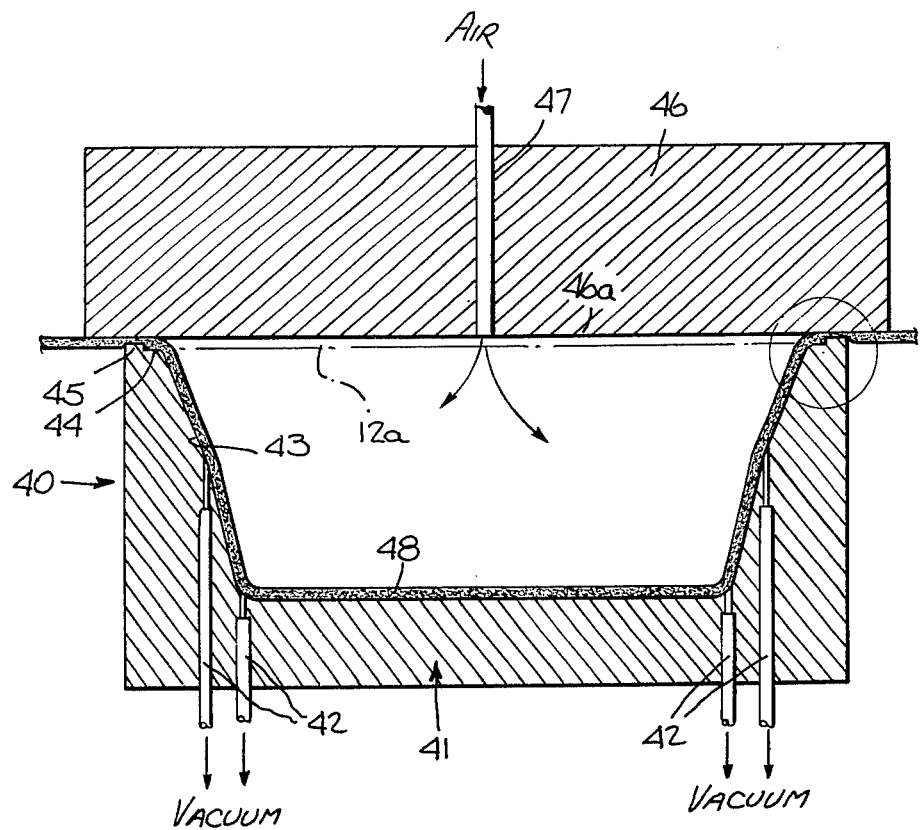
Figure 5:
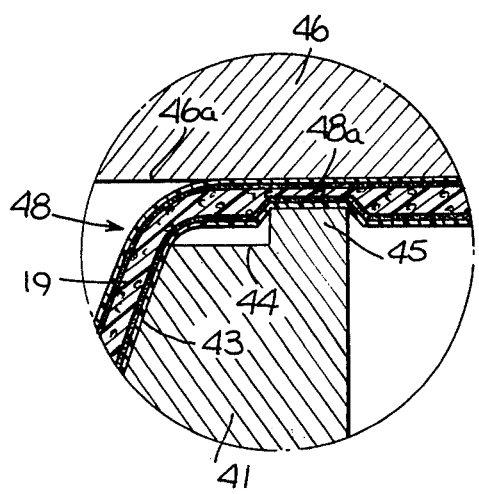
Figure 6:
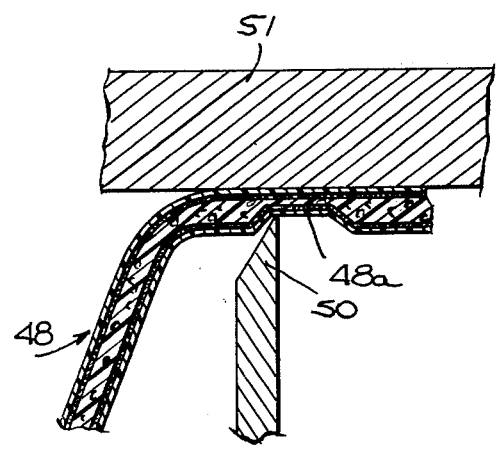

FIG. 4 schematically shows the forming of a receptacle according to the invention, the receptacle being a bowl;

FIG. 5 is a view in detail of the forming of an edge of the receptacle at the area circled in FIG. 4;

FIG. 6 is a schematic illustration of the trimming of edges of receptacles formed according to FIGS. 4 and 5; and FIG. 7 is a schematic illustration of apparatus for continuously laminating foam material and forming articles therefrom in accordance with the invention, the articles illustrated being plates.

Referring to FIG. 1, a receptacle 10 in accordance with the invention is shown in association with a lid or closure 11 therefor which is also made in accordance with the invention. The receptacle 10 is in the shape of a container but it will be appreciated that receptacles of other sizes and shapes, such as plates, bowls and dishes, can also be formed. The film-lined foam plastic material from which the receptacle 10 and lid 11 are formed is generally indicated by reference numeral 12 and, as will be understood from the dotted line showing in FIG. 1, the container-shaped receptacle 10 and lid 11 may be hinged together, as at hinge 13, by extension of the material 12 therebetween. Inclusion of the hinge connection 13 may be desirable in instances where the lid will be removed and reapplied frequently to the container.

The container-shaped receptacle 10 is generally conical, its sides 14 tapering upwardly from a flat bottom 15 to a smooth rim 16. Although other lid arrangements are possible, the lid 11 has a flat central portion 17, and a downwardly flanged rim 18 which has interior diameter substantially equal to the exterior diameter of the container rim 16 to fit snugly thereover. Although it is possible to fabricate such containers by winding a precut blank of the film-lined foam plastic material around a mandrel so that the container body would have an overlapped and heat-sealed or adhesively sealed side seam extending along its height, to which a bottom element would be heat or adhesively sealed, the receptacle 10 shown in FIG. 1 has one-piece construction, being formed without either side or bottom seams by vacuum-forming from a single, disc-shaped blank as will be described. The lid 11 is vacuum-formed in similar manner.

Referring now to FIG. 2 which shows an enlarged section of the laminated material 12, it will be understood that, in general, it is formed by a central layer of foamed plastic material 19 to which respective film liner layers 20 and 21 have been adhesively secured, respectively by adhesive layers 22 and 23, thus to coat both sides of the foamed plastic material 19. Of course, it will be understood that only one side of the foamed material 19 may be coated with the film liner material, if desired. As seen in FIG. 2, the underside of the outer film layer 20 of either the lid or receptacle, or both, may be initially printed, as by a layer of ink printing indicia 24, for decorative or informational purposes. Of course, it will be understood that the film layer 21 which forms the interior surface of either the receptacle 10 or lid 11 might also be printed with color or wording on its underside surface which is adhesively secured to the foamed material 19, if desired.

The foamed plastic material 19 is preferably cellular polystyrene foam having a density between 4 lbs/cu.ft. and 25 lbs./cu.ft., and a thickness within the range of from about 15 to about 80 mils. Its softening point temperature is about 270° F. Such polystyrene foam material is sufficiently flexible such that a continuous web of the material can be wound on a large roll for convenient shipment and storage and subsequent use in a continuous lamination process.

Each of the film layers 20 and 21 is a cast, substantially unoriented polyolefin film, preferably polypropylene, having thickness of from 1 to about 5 mils. As previously noted, the film can be reverse printed before laminating to the foam material to protect the printing from harmful substances, or from possible abrasion during shipping and handling. Polypropylene film suitable for the purpose has a softening point temperature within the range of from about 275° to about 320° F.

Each film layer 20, 21 is coated with an adhesive 22 or 23 which is applied wet to the film and subsequently dried. The coating is a heat-sensitive adhesive which is compatible with both the film and the foamed plastic base material 19. The film is cast as a web to which the adhesive coating is applied so that, after drying, the coated web may be wound on a roll and stored for subsequent use in the laminating process.

It is believed important that the adhesive coatings 22 and 23 be dried thoroughly before laminating the film to the foamed plastic material 19. That is, because the adhesive coating will be heated during the lamination process, complete drying of the adhesive before adhesively securing the film to the foam will avoid the possibility for formation of vapors during the lamination process which could attack the foam material, or cause bubbles to form beneath the film.

The single adhesive coating 22 or 23 on the film layers 20 and 21 must be thick enough to provide a good bond of the film to the foam sheet material, but need be only from 0.0005 to about 0.004 inch thick. Thus, the adhesive layer can be thinner than the 0.001 to 0.005 inch thick film to which it is applied. After drying, the adhesive may be rendered tacky or semi-fluid by heating to a temperature of from about 170° to about 180° F., in which condition it will adhere to the polystyrene foam material 19, yet continue to adhere to the polyolefin film layer on which it is disposed.

It has been found that certain vinylic polymer, and polyamide resin adhesives provide the desired compatability both during the laminating and receptacle forming processes.

As a vinylic polymer adhesive, a polyvinyl acetate maleate copolymer emulsion is particularly preferred. This particularly preferred adhesive has, as a resin base, a vinyl acetate maleate copolymer distributed by Monsanto Chemical Company under the designation TS-71, and as a surfactant, sodium lauryl sulfate distributed by DuPont Corporation under the designation Dupanol C. Since in some cases it is desired to provide decorative printing beneath the film layer, a pigmented adhesive can be advantageously used. A preferred pigment for use with a resin base and surfactant set forth above is Pigment No. 192E202 produced by Interchemical Corporation, a pigment consisting of 50% titanium dioxide dispersed in water with 4% hydroxyethyl cellulose and a small amount of wetting agent. The proportions by weight of the above constituents in a preferred pigmented adhesive are: resin base, 80–90 parts; pigment, 5–15 parts; and surfactant, 5 parts, as a 1% solution in water.

An excess of pigment affects the bond strength, and too little pigment reduces the hiding power. The amount of surfactant used should not vary more than 0.005%. The softening point of this adhesive is between 170° and 180° F., but it remains tacky over a considerable temperature range, up to and including the 250°–275° F. temperature range employed in accordance with the invention. This adhesive resists delamination at elevated temperatures, and receptacles formed of film secured to foam with the adhesive just described are capable of retaining water at or near the boiling point for substantial periods and are suitable for use in heating some prepared foods in microwave ovens.

In another preferred embodiment an aqueous dispersion of polyvinyl acetate copolymer was used as the adhesive, the particular composition being 70% of Monsanto Chemical Company's aqueous dispersion of polyvinyl acetate copolymer identified as its Resin Ra-315, and 30% of GELVA copolymer dispersion of polyvinyl acetate identified as its TS-100. It was also applied wet to the cast polypropylene liner film material and permitted to dry thoroughly.

Other successful formulations for the adhesive included pigmented blends of polyvinyl acetate and polyvinyl acetate acrylic copolymer resin emulsions consisting of 300 grams of either Monsanto GMS 264 or Monsanto GMS 269 vinyl acetate maleate copolymer, 300 grams of Borden No. 1 white pigment dispersion (in nitrocellulose), 20 grams of Rohm & Haas Acryloid B72 100% acrylic polymer, 30 grams of normal propyl acetate solvent, 125 grams of methac 80 solvent mixture of 80% methylacetate and 20% methanol, and 125 grams of ethyl alcohol solvent, for a total of 900 grams. These adhesives were coated on to 0.001 inch cast polypropylene film, dried, and then successfully laminated to both 0.040 inch gage, 13–14 lb. density foamed polystyrene sheet, and 0.070 inch gage, 7–7.5 lb. density foamed polystyrene sheet material.

Cast co-extruded films of polypropylene/ethylene vinyl acetate and polyethylene/ethylene vinyl acetate were each successfully laminated to similar foamed polystyrene materials, using the ethylene vinyl acetate as the adhesive.

The process by which the adhesively coated film layers 20 and 21 are adhesively secured respectively to the opposite sides of the foam layer 19 is illustrated in FIG. 3. A continuous web of the foamed polystyrene plastic material 19 is shown travelling from right to left, first passing between heaters 30 and 31, and thence between a rubber pressure roll 32 and steel back-up roll 33, which are the laminating rollers of the apparatus. The heaters 30, 31 are banks of infrared heating units located parallel to, and above and below the path of travel of the foamed sheet material 19. They heat the web of foam plastic material 19 to a temperature within the range of from about 250° to about 275° F., preferably to a temperature of about 260° F. where polypropylene film is to be used. Where polyethylene film is to be used, the laminating (and forming) temperature should be held to not more than about 250° F. In this regard, it is important to control the temperature to which the foam material as well as the film material is heated, because excessive heating will permit collapse of the foam cells as the foam is further processed. A roll 34 of the adhesive-coated polyolefin film which will form the film layer 20 is mounted above the rubber pressure roller 32 as shown, and a roll 35 of the adhesive-coated film which will form the film layer 21 is similarly mounted as shown below the back-up roller 33. The film rolls 34 and 35 are wound with their respective adhesive surfaces 22, 23 facing down so that, as the rolls 34, 35 are unwound over the respective rollers 32, 33, their adhesive-coated surfaces are exposed to respective blasts of hot air from hot air blowers 36, 37.

The hot air blowers preheat the adhesive coated film to a temperature within the range of from about 100° to about 180° F. immediately prior to the pressing of the film liners against the centrally disposed foamed material 19. The adhesive coatings 22, 23 are rendered tacky or semi-fluid at the time of contact with the heated foamed sheet 19 as the layers of the materials are passed between and through the cold laminating rollers 32, 33.

The pressures exerted on the foamed sheet material 19 as it passes through the nip between the rollers 32, 33 is adjusted and maintained such that the foam material will recover its original thickness, as illustrated, after it passes therethrough. In this regard, and as previously mentioned, control of temperature is important. The rubber pressure roll 32 and steel back-up roll 33 are cold, and should be maintained at a temperature of between 100° and 150° F. to avoid wrinkling of the film carried thereby, as would occur at higher temperatures, which wrinkling would cause creases to be formed in the film as it passes through the nip between the rollers 32, 33. Of course, excessively high temperatures would cause the film itself to become tacky, or to melt, and stick to the rollers 32 and 33.

An advantage of using hot air blowers 36, 37 to preheat the adhesive coating on the film layers as they are carried by rollers 32, 33 is the "ironing" or smoothing effect of the blowers on the film itself, to aid in preventing the formation of wrinkles as might otherwise occur during heating of such thin plastic layers.

After emergence from the nip between the laminating rollers 32, 33, the laminated web of material is cooled, and it will then be found that the film layers 20 and 21 are firmly bonded to the foamed sheet material 19 by the respective adhesive layers 22, 23. If necessary, additional press nips can be provided by one or more additional pairs of rollers (not shown) similar to, and sequentially in line with the rollers 32, 33. The laminated sheet material 12 can then be wound on a roll for storage, or it can pass directly to a forming station for forming into receptacles.

FIGS. 4 and 5 show apparatus, generally indicated by reference numeral 40, for forming a receptacle from a disc-shaped blank 12a (dotted lines) of the film-laminated foamed sheet material 12. The apparatus 40 includes a vacuum mold portion 41, having vacuum air lines 42 as shown, and an interior mold surface 43 having the shape of the receptacle to be formed. In addition, its open top 44 is rimmed by a narrow, upstanding peripheral lip 45 for a purpose as will be described. A heated plate or pressure block 46 covers and closes the mold portion 41. The pressure block 46 is provided with an air aperture 47 for admitting air under pressure into the mold cavity. In the embodiment shown, the receptacle formed in the apparatus 40 is a bowl generally indicated by reference numeral 48, although it will be understood that different shapes could be similarly formed.

To form a receptacle in the apparatus 40, the pressure block 46 is heated to a temperature of about 250° F. at its underside surface 46a. The underlying mold portion 41 is cold, i.e. at room temperature or, in any event, kept below 150° F. The blank 12a of material is placed on and across the rim 44 of the mold portion 41, the blank resting on the narrow peripheral lip 45 as shown. The heated block 46 is then lowered into surface contacting relation with the blank 12a of laminated sheet material, the block 46 being pressed against the peripheral lip 45 to collapse the cellular foamed plastic material 19 (FIG. 2) along the periphery of the laminated blank 12a, as best seen in FIG. 5, and clamping the blank 12a firmly in position. The heated block 46 heats the laminated material 12a to a temperature of about 250° F. by its contact therewith, this being above the softening point temperature of the adhesive coatings 22, 23 (FIG. 2) but below the softening point temperatures of the film liner and foam materials 19, 20, 21. The heating continues slowly and evenly for a period of time until all of the laminated structure, including the foamed sheet 19, is heated to the same temperature. Vacuum is then applied through the vacuum openings 42 to draw the uniformly heated and now deformable laminated material 12a into conforming relation with the interior surface 43 of the mold portion 41, air being admitted through the air opening 47 of the block 46 to permit the material 12a to be drawn away from the underside surface 46a of the block. It will be noted that the forming temperature of 250° F. is such that the sheet material 12a is readily deformable and expandible into the desired shape, yet not so high as to cause structural disintegration of the material, as by collapse of the foam cells, delamination and possible rupture of the film liner material, possible rupture of the laminated material itself, and otherwise.

The vacuum is released and the mold apparatus 40 is then opened and the somewhat cool bowl 48 ejected therefrom. In this regard, it will be noted that contact of the drawn plastic material with the relatively cool interior wall 43 of the mold 41 causes prompt and sufficient cooling of the laminated plastic material, such that it will not further deform when ejected from the mold. Ejection is preferably by air under pressure, introduced through the mold openings 42.

The stepped contour provided by the lip 45 at the rim of the vacuum mold 41 produces a thinned section 48a along the periphery of the bowl 48, as best seen in FIG. 5, which is then trimmed in the manner indicated in FIG. 6. The trimming step could be conducted in the mold itself by means of a vertically activated ring-shaped trimming blade (not shown) mounted immediately adjacent to the peripheral lip 45. However, and as shown in FIG. 6, the thinned portion 48a can be neatly trimmed by a ring-shaped knife 50 and backing plate 51 in a separate trimming step after the receptacle 48 has been removed from the mold forming apparatus 40.

Referring now to FIG. 7, a continuous process for making film laminated plastic receptacles in the form of shallow draft picnic plates 55 is shown. The process combines the laminating, forming, blanking, and trimming steps substantially as previously described, using film material which has been coated with adhesive in a previous operation. In the arrangement shown, the plates 55 have a film liner on only their interior surfaces, but it will be understood that by laminating a layer of film material to the opposite side of the foam material, in manner generally as illustrated in FIG. 3, such plates may be provided with a film liner on the exterior surfaces thereof.

With reference to FIG. 7, a web of cellular polystyrene foamed plastic material 19, having density and thickness as previously described, is shown wound in the form of a stock roll 56 from which it is unwound in the direction shown by the arrow. The web passes through a pair of guide rollers 57, 58, and between infrared heaters 59, 60 which heat the foamed material to a temperature within the range of from about 250° to about 275° F. At the exit end of the heaters the web is supported by a support roll 61.

Cast, unoriented polypropylene film, to which an adhesive coating has been applied and dried as aforesaid, is stored on a roll 62 thereof. Whereas in FIG. 2 the film material was wound with its adhesive-coated side facing down, in the illustration of FIG. 7 the material is wound having the adhesive coated side facing up or outward with respect to the roll. For decorating each of the plates 55 with a printed design, for example peripherally about its rim and perhaps centrally thereof, a film web 62a is printed in circular patterns (not shown) corresponding to each plate, using conventional printing techniques on the film, and the adhesive coating is printed or otherwise coated thereover.

The film web 62a passes through a photocell device generally indicated by numeral 63 and tensioning roller 64 controlled by the photocell, to register the thus printed film patterns over the respective mold apertures 66 of the rotary vacuum forming molder drum 67 when the film is fed on to the latter. Such print registering technique is conventional and need not be further described. As the film web 62a passes around a cold pressure roller 65 a blast of hot air from a hot air blower 68 preheats the adhesive coating on the film web to a temperature of from about 100° to about 180° F. The film web meets and is laminated to the heated web of foam plastic material 19 as the two enter and pass through the nip 69 formed by the cold pressure roller 65 and cold drum 67. That is, the adhesive coating on the film 62a is rendered tacky by the heated polystyrene foam material as the two preheated webs meet and are carried along by the power driven, rotating drum 67. The drum 67 is not heated, but is relatively cool, such that the adhesive and foamed material will be fairly promptly cooled to a temperature at least below the softening point of the adhesive, and it will be found that the film remains laminated to the foam base material during the subsequent forming operation to be described. However, it will also be found that the laminated material remains sufficiently hot to be readily deformed and expanded by vacuum to assume the plate-shape of any cold mold cavity 66 on the drum. Of course, the width of the cylindrical drum 67 is slightly larger than the rim diameter of the plate-shaped mold cavity 66, so that the pressure roller 65 continuously presses the film and foam materials against a cylindrical surface. Preferably, two plates are formed side-by-side at each mold station, although such is not illustrated.

Each of the mold cavities 66 has a conventional and suitably arranged vacuum opening (not shown), similar to the vacuum openings 42 in the mold component 41 of FIG. 4, which are connected to an appropriate vacuum source (not shown). During the clockwise rotation of the molder drum 67, and at an angular location of about 20° beyond the nip 69, at which the laminated material has cooled to a temperature just below the softening point temperature of the adhesive, from 26 to 28 inches of vacuum is applied to each mold cavity 66 to evacuate the space below the laminated material so that it is drawn into conforming relation with the interior surface of the mold cavity 66, in manner similar to that described in connection with FIG. 4. It will be noted that the film liner 62a is on the exterior side of the laminated material with respect to the drum 67, and therefore lines the interior surfaces of the thus formed plate preforms 70. The plate preforms 70 are removed from the cavities 66 in a continuous strip 71 of the laminated material, within which they are formed in regularly spaced relationship to each other.

After leaving the molder the laminated material strip 71 with the plate preforms 70 therein travels through a blanking station generally indicated by reference numeral 72. The banking station is conventional, and is therefore only diagrammatically illustrated as having a stationary cylindrical blanking die head 73 having a sharp peripheral knife edge 73a against which the laminated material 71 is repetitively pressed, in timed relation with the sequence of plate preforms 70, by the reciprocating die head 74. The die head 74 is recessed appropriately as at 74a to accommodate the underside shape of each plate preform 70 which it engages. The knife edge 73a cuts the individual plates 55 from the strip 71, the plates being ejected by appropriate conventional ejection means (not shown) from the die head 74 and on to the bottom of the stack of plates 55. The stack is thus urged in the direction of the arrow A. Of course, the strip of plate preforms 70 is fed with intermittent movement into the blanking station 72 by an intermittent feeding device (not shown). Considering that the mold drum 67 has a pair of plate molds 66 at each mold station, the continuous apparatus forms plates 55 at a rate of 120 per minute.

The strip 71 emerges from the blanking station 72 in the form of a flat trim sheet with circular cutouts corresponding to the locations of the plate preforms 70. The trim sheet 71a may be again heated to above the softening point temperature of the adhesive which secures the film liner material to the foamed plastic base material so that a film trim strip 62b may be stripped from the foam material trim strip 19a, for salvage of the separate materials if desired. If the printed circular plate patterns of the film strips 62a are properly registered with the mold cavity 66, the film trim will not bear any printing.

As previously mentioned, the finished plates 55 are decorated by appropriately printed designs applied to the underside of the film liner, thus to shield the printing and impart an apparent high gloss finish thereto by the film itself. Of course, it is apparent that the film in such cases must be a transparent and clear material so that the printing can be seen therethrough. Polypropylene film has these qualities, as well as the toughness, water imperviousness and heat resistance desired in receptacles, such as the picnic dish plates 55, which may be used for hot or cold foods and beverages. Printed or unprinted, the film laminated foam receptacles of the invention have the toughness, glossyness and other attractive properties desired in receptacles which are intended for such use.

Receptacles formed of cellular polystyrene foam coated on one or both sides with polypropylene film secured to the foam material by a vinylic polymer or polyamide resin adhesive have been tested for heat resistance, for use as containers for foods heated in microwave ovens, and for shelf life of food products contained in the receptacles. For example, bowls formed of 7.5 lb./cu.ft. density polystyrene foam, 70 mils thick and coated on each of its sides with a liner of 1 mil thick polypropylene film secured to the foam by a vinylic adhesive, have been found to be satisfactory food packages having good shelf life characteristics when provided with closures which are heat sealed on to the bowls. The moisture lost by such closed bowls is low over periods of several weeks, keeping such foods as cottage cheese and yogurt in satisfactory conditiion with respect to appearance, flavor, and odor.

Microwave heating tests were performed by so heating institutional type frozen foods on plates formed of film laminated foamed plastic material according to the invention. Such foods as chop suey and beef stew can be heated to temperatures of 145° to 160° F. in a microwave oven on such plates and, although the food product boils in contact with the plate surfaces, the plates remain in good condition.

Soup bowls made according to the invention and filled with boiling water were allowed to remain standing in ambient room temperature conditions until the water cooled to room temperature, whereupon it was found that the bowls remain in good condition.

Thus, receptacles made from polyolefin film lined, cellular polystyrene foamed plastic material, and techniques for laminating such material and for making such receptacles, have been described, which achieve all of the objects of the invention.

What is claimed is:

1. A receptacle comprising a base of cellular foam plastic material having a thickness of from substantially 15 to substantially 80 mils, a continuous liner of substantially unoriented polyolefin film having a thickness of from substantially ½ to substantially 5 mils covering the food contacting surfaces of the cellular foam base, and an adhesive comprising a resin plastic material selected from the group consisting of polyvinyl acetate-maleate copolymer, polyamide resin, a blend of polyvinyl acetate and polyvinyl acetate-acrylic copolymer, and ethylene-vinyl acetate copolymer, said adhesive being disposed between said foam base and said liner and securing said base to said liner.

2. A receptacle according to claim 1 wherein the polyolefin is polyethylene or polypropylene.

3. A receptacle according to claim 2 wherein the foam plastic material is foamed polystyrene.

4. A receptacle according to claim 1 wherein the thickness of the foam is from about 40 to about 70 mils.

5. A receptacle according to claim 2 wherein the adhesive is a polyvinyl acetate maleate copolymer.

6. A receptacle according to claim 2 wherein the adhesive is a polyamide resin.

7. A receptacle according to claim 2 wherein the adhesive is a blend of polyvinyl acetate and a polyvinyl acetate acrylic copolymer.

8. A receptacle according to claim 2 wherein the adhesive is ethylene vinyl acetate.

9. A receptacle according to claim 1 wherein said polyolefin film is transparent so that printing can be seen therethrough.

* * * * *